US008872563B2

(12) United States Patent
Lofton (10) Patent No.: US 8,872,563 B2
(45) Date of Patent: Oct. 28, 2014

(54) SYSTEM, METHOD AND APPARATUS FOR COMMUNICATION WITH OCCUPANTS OF A VEHICLE

(71) Applicant: Eddie B. Lofton, Jacksonville, FL (US)

(72) Inventor: Eddie B. Lofton, Jacksonville, FL (US)

(*) Notice: Subject to any disclaimer, the term of this patent is extended or adjusted under 35 U.S.C. 154(b) by 0 days.

(21) Appl. No.: 13/963,429

(22) Filed: Aug. 9, 2013

(65) Prior Publication Data
US 2013/0324048 A1 Dec. 5, 2013

Related U.S. Application Data (63) Continuation-in-part of application No. 13/768,175, filed on Feb. 15, 2013, now Pat. No. 8,532,575, which is a continuation of application No. 13/469,156, filed on May 11, 2012, now Pat. No. 8,401,477, which is a continuation of application No. 12/464,915, filed on May 13, 2009, now Pat. No. 8,200,158.

(60) Provisional application No. 61/189,024, filed on Aug. 15, 2008.

(51) Int. Cl.
*H03K 3/289* (2006.01)
*H03K 3/356* (2006.01)
*H04B 7/24* (2006.01)
*H04R 23/00* (2006.01)
*G08G 1/0965* (2006.01)
*H04B 10/114* (2013.01)

(52) U.S. Cl.
CPC ............... *H04B 7/24* (2013.01); *H04R 23/008* (2013.01); *G08G 1/0965* (2013.01); *H04B 10/1141* (2013.01)
USPC ............................ 327/203; 327/202; 327/204

(58) Field of Classification Search
USPC ........................................ 455/39–48, 59–90
See application file for complete search history.

(56) References Cited

U.S. PATENT DOCUMENTS

| 5,241,410 | A | * | 8/1993 | Streck et al. ................... 398/115 |
|---|---|---|---|---|
| 5,343,043 | A | * | 8/1994 | Johnson ..................... 250/338.5 |
| 6,052,603 | A | | 4/2000 | Kinzalow |
| 6,609,055 | B2 | | 8/2003 | Stanley |
| 6,804,525 | B2 | | 10/2004 | Davis |
| 6,917,801 | B2 | | 7/2005 | Witte |
| 7,353,088 | B2 | | 4/2008 | Eagen et al. |
| 7,376,137 | B2 | | 5/2008 | Sung et al. |
| 7,619,622 | B2 | | 11/2009 | Souza et al. |
| 2002/0055343 | A1 | | 5/2002 | Stetzler et al. |
| 2002/0140215 | A1 | | 10/2002 | Breed et al. |
| 2003/0016636 | A1 | | 1/2003 | Tari et al. |
| 2003/0136600 | A1 | | 7/2003 | Breed et al. |
| 2004/0058649 | A1 | | 3/2004 | Grady |

(Continued)

*Primary Examiner* — Brandon S Cole
(74) *Attorney, Agent, or Firm* — Larson & Larson, P.A.; Frank Liebenow; Justin P. Miller (57) ABSTRACT

A vehicle communication system for communicating with a person who is within a vehicle includes a device for hearing audible noises that emanate within the vehicle at locations external to the vehicle without making physical contact with the vehicle. Communication from the person in the vehicle to a person external to the vehicle is performed by aiming a light beam from the vehicle and receiving reflections of the light beam. The light beam is modulated by vibration of the vehicle caused the audible noises from within the vehicle. The received light beam is then processed to reproduce the audible noises so that the audible noises can be heard from a location outside of the vehicle, even when the vehicle is sealed (windows closed, etc.).

20 Claims, 6 Drawing Sheets

(56) References Cited

U.S. PATENT DOCUMENTS

2007/0112476 A1 5/2007 Obradovich
2008/0140868 A1 6/2008 Kalayjian et al.
2011/0228727 A1* 9/2011 Julo et al. ................. 370/328
2011/0269408 A1* 11/2011 Brommer et al. ......... 455/67.11
2012/0040650 A1* 2/2012 Rosen ...................... 455/414.1

* cited by examiner

SYSTEM, METHOD AND APPARATUS FOR COMMUNICATION WITH OCCUPANTS OF A VEHICLE

CROSS-REFERENCE TO RELATED APPLICATION

This application is a continuation of U.S. patent application Ser. No. 13/768,175, filed Feb. 15, 2013, which is a continuation of U.S. patent application Ser. No. 13/469,156, now U.S. Pat. No. 8,401,477 issued Mar. 19, 2013, which is a continuation of U.S. patent application Ser. No. 12/464,915, now U.S. Pat. No. 8,200,158, issued Jun. 12, 2012, which takes priority from U.S. provisional patent application Ser. No. 61/189,024; filed Aug. 15, 2008, the disclosures of which are hereby incorporated by reference.

FIELD OF THE INVENTION

This invention relates to the field of communications and more particularly to a system for communicating with an occupant of a sealed vehicle.

BACKGROUND

There are many needs for communicating with an occupant of a vehicle, car, bus, truck, etc. Examples of such are to initiate a transaction at a drive through, answering questions at a roadblock or checkpoint, during a traffic stop, etc. Currently, to perform such communications requires an occupant of the vehicle open a window or door and communicate through that open window or door.

An example of such communication occurs when one places an order at an order taking position of a fast food restaurant. In such, the occupant must roll down their window (or open their door) and verbally communicate with a speaker and microphone located at the order taking position. By opening the window, the occupant is exposed, not only to the weather, but to a potential of theft, bodily injury or carjacking. Meanwhile, the person taking the order is safe, dry and warm inside the fast food restaurant. To further compound the difficulty in communication, often the speaker is of inadequate quality to clearly hear the order taker and the background noise coupled with microphone quality and position makes it difficult for the order taker to hear and understand the occupant of the vehicle.

In certain climates, weather makes it uncomfortable and inconvenient for the occupant to open their window. In some location, cold weather includes temperatures well below zero, wind, rain, hail, snow, blowing snow, blowing sand and dust, etc. It is often uncomfortable to open a window in such climates, especially when young children are also situated in the vehicle. Many potential customers of establishments with drive-thru facilities are dissuaded from frequenting such establishments during bad weather.

In certain neighborhoods, it is dangerous to open a vehicle window for fear that a suspect will reach in the vehicle, cause bodily injury, grab something of value, coerce the occupant into getting out, etc. Many potential customers of establishments with drive-thru facilities are dissuaded from frequenting such establishments due to fear of lost valuables and/or bodily harm.

In certain law-enforcement situations it becomes necessary for a law officer, border guard, sentry, etc, to communicate with a vehicle occupant. For example, when a law officer makes a traffic stop, the officer must communicate with the driver to inform them of what they did wrong (speeding), get their name, license number, insurance company, etc. Similarly, at a checkpoint such as at a roadblock, border, etc, it is sometimes needed to ask questions of the vehicle occupants. The same or similar environmental and safety issues are present in these situations. For example, when a law officer makes a traffic stop, it might be raining, snowing, etc. Often, the officer must get out of their vehicle to retrieve the driver's information, return to their vehicle to access their computer system and issue the summons, then exit their vehicle to present the summons to the driver. This exposes the officer to the elements and increases the risk of the officer being hit by a passing vehicle, especially in bad weather. Furthermore, the initial confrontation with the driver is a dangerous situation for the officer. If the individual is wanted for something serious, has a gun or is otherwise dangerous, the initial confrontation often becomes a life threatening situation for the officer.

There are existing ways to perform such communications, none of which are practical. For example, a cellular phone can be used to call the fast food establishment to place an order just before approaching the pick-up window. This is not practical for several reasons: not everybody has a cell phone, cell phone minutes cost money that most don't want to waste and use of a long-range device such as a cell phone does not establish a working queue for the pick-up window, therefore a first person might arrive at the window and their order is not ready while the order is ready and getting cold for the fifth person in queue.

Another way to perform such communications is with a short-range wireless communication device such as a walkie-talkie. This solution would work if everybody had such a device and there were sufficient channels such that one wouldn't be placing an order at one fast food establishment and the order be taken at a different establishment.

There are known one-way methods of communicating with a vehicle occupant. For years, it has been known to locally transmit audio to occupants of vehicles through the ubiquitous AM/FM radio present in almost every vehicle. This has been done to warn drivers of weather and traffic issues, to guide drivers into theme parks, to describe attractions as the occupants drive through (e.g., animal parks), etc. This has long been used as an inward way to communicate in one direction and has no way for the vehicle occupant(s) to communicate outwardly.

Another one-way method of communications that has been around for many years utilizes light energy reflected off of a window such that, when an occupant behind the window makes noise, the noise causes the window glass to vibrate, thereby modulating the reflected light energy. The reflected light energy is received by a sensor and the sound is demodulated or extracted out of the reflected light. The light is often from a laser to provide an accurate, directional beam. This has been used, predominately in ease dropping, probably originating with Leon Theremin in the Soviet Union approximately 1947 using a low-power infra red beam instead of a laser. For example, a spy would sit in a hotel across from an embassy with such a device and listen in on what was being said behind closed doors within the embassy. Nowadays, laser listening devices similar to these are available to the amateur spy from many suppliers on the Internet.

What is needed is a system that will enable two-way communication without requiring opening of the vehicle.

SUMMARY

A two-way communication system for communicating with a person who is within a closed vehicle is disclosed.

Communication to the person is done with a short-range radio transmission to a radio within the vehicle. Communication from the person is done by reflecting a light beam on a window of the vehicle and receiving the light beam, which is modulated by vibration of the window caused by the person's voice. The received light beam is then processed to reproduce the sound of the person's voice.

In one embodiment, a vehicle communication apparatus is disclosed including a light source located outside of a vehicle and directed onto the vehicle. The light source emits light (e.g. laser light, infra-red light, visible light, encoded light, etc.) in a direction towards the vehicle. A detector that is positioned to receive at least part of the light that is reflected from the vehicle converts the at least part of the light into an electrical signal which is processed by an audio detector that is operatively coupled to the detector. The audio detector receives the electrical signal and extracts an audio signal from the electrical signal which is fed to an audio output device operatively that receives the audio signal from the audio detector and reproduces the audio signal to be audible outside the vehicle.

In another embodiment, a method of communicating between a person within a vehicle and a person external to the vehicle is disclosed. The method includes providing the vehicle communication apparatus above along with a radio frequency transmitter that is located outside of the vehicle and that modulates a second audio signal onto a radio frequency signal; and a radio receiver that is associated with the vehicle and is located within the vehicle. The radio receiver demodulates the first audio signal from the radio frequency signal and presents the second audio signal for listening within the vehicle. The method proceeds with modulating the second audio signal on a radio frequency by the radio frequency transmitter and receiving the radio frequency by the radio receiver within the vehicle, then demodulating the second audio signal from the radio frequency and reproducing the second audio signal by the radio receiver within the vehicle such that the second audio signal is audibly reproduced within the vehicle. A light beam is emitted from the light source towards the vehicle and at least some of the light beam is reflected from the vehicle and received by the detector. The audio signal is extracted from the reflected light beam by the audio detector and amplified by the audio output device to be audible at a location external to the vehicle.

In another embodiment, a vehicle communication system is disclosed. The vehicle communication system has a radio frequency transmitter that receives a first audio signal (e.g. from a microphone) and modulates the first audio signal onto a radio frequency signal. A radio associated with a vehicle demodulates the first audio signal from the radio frequency signal, amplifies the first audio signal, and emits the first audio signal from a transducer for listening within the vehicle. A light source is directed towards the vehicle, the light source emits light onto the vehicle (e.g. laser light, infra-red light, encoded light, etc.). A detector receives at least part of the light reflected from the vehicle and converts the at least part of the light that is reflected from the vehicle into an electrical signal. An audio detector is operatively coupled to the detector and extracts a second audio signal from the electrical signal which is then coupled to an audio output device that receives the second audio signal and reproduces the second audio signal to be audible external to the vehicle.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Figure 1:
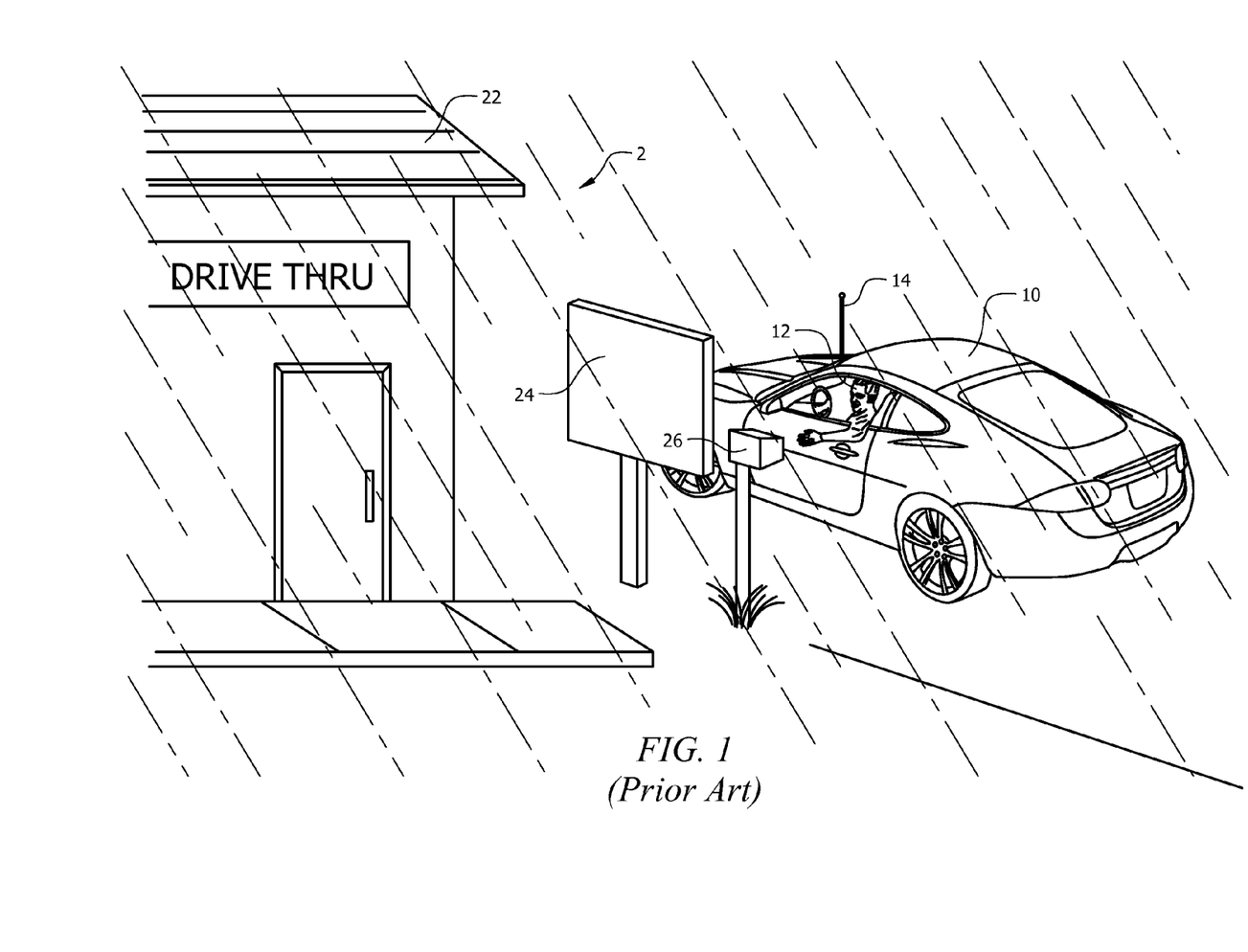
FIG. 1 illustrates a perspective view of a system of the prior art.

Referring to FIG. 1, a perspective view of a system 2 of the prior art will be described. Presently, the typical drive-through customer order interface 2 consists of a speaker and a voice pickup located within range of a vehicle 10. In some cases, the speaker is integrated into a sign 24 and the sign often presents a menu of ordering options to the driver 12 of the car 10. The voice pickup is often located either on the sign 24 or in a separate structure 26 for sound isolation from the speaker. In operation, the driver 12 opens their window, speaks into the voice pickup and listens to the order-taker who is typically within the establishment 22. After placing the order, the driver 12 typically drives the car to a pickup window that is physically on the establishment 22 where the order is paid for and delivered to the driver. Most vehicles have some sort of AM and/or AM/FM and/or FM radio with an antenna 14 (some antennas are integrated into the vehicle glass or other part of the vehicle).

Several problems exist with the system 2 of the prior art. One is weather. During rain, snow, sleet, hail, dust storms, high winds, etc, it is often undesirable to open one's window, after which, the driver 12 and passengers are exposed to such elements. Furthermore, the rain, dust, etc, are harmful to the interior of the vehicle 10, causing discoloring, mildew, stains, etc. Another problem is insects such as mosquitoes, bees, wasps, hornets, etc. Once the driver 12 opens his or her window, any sort of insect is capable of entering the vehicle, possibly causing irritation or worse, a distraction, especially if the insect bites or stings the driver. Another problem is allergies, in that, during allergy season, many drivers 12 and occupants are best off in closed confinement and, opening of the window, allows a greater number of allergens into the vehicle. Another problem is security. There are many reported cases of theft, assault, carjacking, bodily injury and the like occurring when the driver 12 of the car 10 opens their window to place an order in a system 2 of the prior art. Once the window is open, the driver 12 is vulnerable to attack from a perpetrator that sneaks up from behind.

Figure 2:
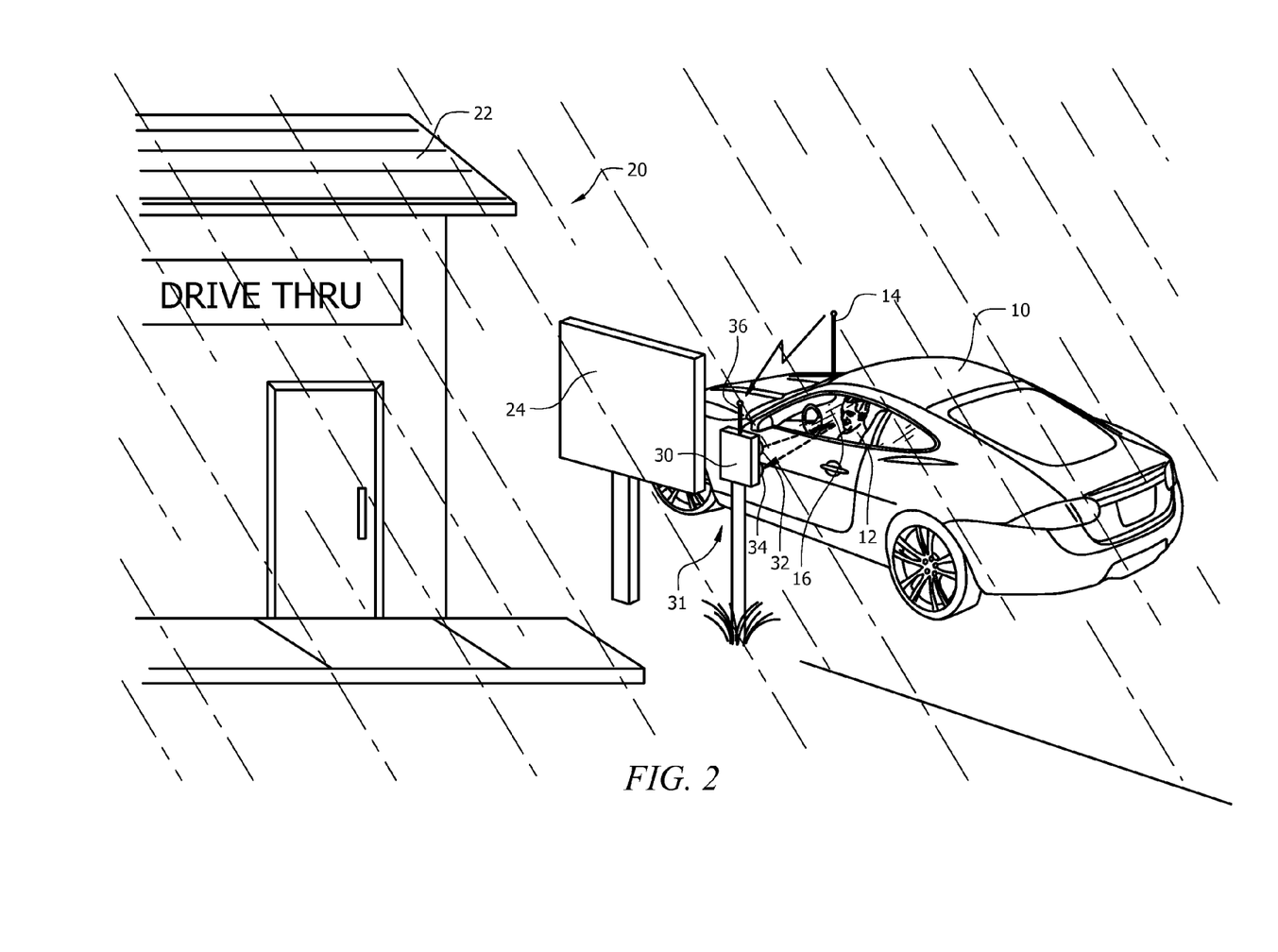
FIG. 2 illustrates a perspective view of a system of a first embodiment of the present invention.

Referring to FIG. 2, a perspective view of a system 20 of a first embodiment of the present invention will be described. Although applicable to many vehicle-building interface situations, including, but not limited to, fast-food or other food-related drive-through systems, banking systems, car washes, etc, the present invention is shown in an exemplary system for a food-related, drive-through. In the example shown, the vehicle 10 is at an order-taking position of a typical drive-through establishment 22. The driver 12 has not opened his or her window 16 and is in communication with the order taking person (not shown) who is inside the establishment 22. Ordinarily, it would be difficult for the order taking person to be able to hear the driver 12, but the order taking station includes a communication system 31 housed in, for example a free-standing communications box 30, although any particular mounting of the communication system 31 is anticipated, including mounting it within signage 24.

The communication system 31 includes a voice detector 32/34 and a short-range radio frequency transmitter 88 (see FIG. 6) with antenna 36. In a preferred embodiment, the voice detector 32/34 includes a light transmitter 32 and a light receiver 34. Light is transmitted from the light transmitter 32, reflects off of the car window 16 and then reflected light is detected by the light receiver 34. As the driver 12 speaks, the window vibrates causing the reflected light signal to be modulated with the driver's voice. The reflected light signal is then demodulated and the voice is detected and relayed to the order taker (not shown) within the establishment 22. It is anticipated that after detecting the voice, the voice signal is amplified, optionally filtered/noise canceled, and then sent to the order taking station within the establishment 22 over wires or over a wireless connection, as known in the industry.

Although any form/wavelength of light is anticipated, one embodiment uses a low-power laser beam. Such a low power laser beam is easier to detect in bright sunlight and has good directionality. Although the present invention works well with ordinary reflection from the typical car window 16, it is also anticipated that in alternate embodiments, a reflective sticker is affixed to a surface of the window 16 to improve reflection of the light. When provided, some embodiments of the sticker include advertising on the outside and/or inside surface and/or a message on the inside surface (e.g., "Tune to 100.2 FM"). In some embodiments, the sticker includes a bar code that is detectable by the voice detector 32/34. In such embodiments, the bar code is used to recall previous interactions with the car/vehicle 10 to provide enhanced services such as recalling previous orders, recalling a credit-card-on-file or recalling the driver's name, etc.

In an alternate embodiment, the driver's 12 voice is detected by a high-gain microphone instead of reflected light. This embodiment requires a great deal of filtering and noise cancellation to rid the voice signal of extraneous noise from the vehicle 10 and the environment.

So that the driver 12 hears the order taker, a voice transmitter is provided. Although a highly amplified voice speaker is anticipated, this is not a preferred embodiment due to the disturbance it would create as well as the poor quality of the sound that makes it into the vehicle 10 with closed window 16. Instead, the preferred embodiment employs a short-range radio transmitter 88 (see FIG. 6) within the communication system 31, which transmits a radio signal from the antenna 36 to the vehicle radio 15 (see FIG. 3) through the vehicle antenna 14 (any form of vehicle antenna 14 is anticipated). It is preferred that the radio transmitter 88 transmits over a locally unused AM or FM radio channel. This is preferred because most vehicles 10 are factory equipped with an AM radio, an FM radio or an AM/FM radio. It is also anticipated that the radio transmitter 88 transmits simultaneously on both an AM station and an FM station.

Figure 3:
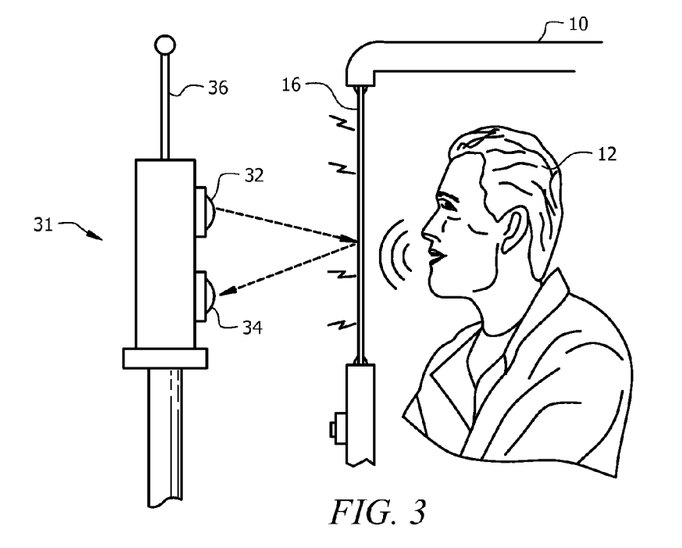
FIG. 3 illustrates a plan view of a system of a first embodiment of the present invention.

Referring to FIG. 3, a plan view of a system of a first embodiment of the present invention will be described. The communication system 31 includes a voice detector 32/34 and a short-range radio frequency transmitter 88 (see FIG. 6) with antenna 36. In a preferred embodiment, the voice detector 32/34 includes a light transmitter 32 and a light receiver 34. Light is transmitted from the light transmitter 32, reflects off of the car window 16 and then reflected light is detected by the light receiver 34. As the driver 12 speaks, the window 16 vibrates causing the reflected light signal to be modulated with the driver's voice. The reflected light signal is then demodulated and the voice is detected (see FIG. 6) and relayed to the order taking station (see FIG. 6) within the establishment 22. It is anticipated that after detecting the voice, the voice signal is amplified, optionally filtered/noise canceled, and then sent to the order taking station within the establishment 22 over wires or over a wireless connection, as known in the industry.

Although any form/wavelength of light is anticipated, the preferred uses a low-power laser beam. Such a low power laser beam is easier to detect in bright sunlight and has good directionality. Although the present invention works well with ordinary reflection from the typical car 10 window 16, it is also anticipated that in alternate embodiments, a reflective sticker is affixed to a surface of the window 16 to improve reflection of the light. When provided, some embodiment of the sticker include advertising on the outside and/or inside surface and/or a message on the inside surface (e.g., "Tune to 100.2 FM"). In some embodiments, the sticker includes a bar code that is detectable by the voice detector 32/34. In such embodiments, the bar code is used to recall previous interactions with the car/vehicle 10 to provide enhanced services such as recalling previous orders, recalling a credit-card-on-file or recalling the driver's name, etc.

Figure 4:
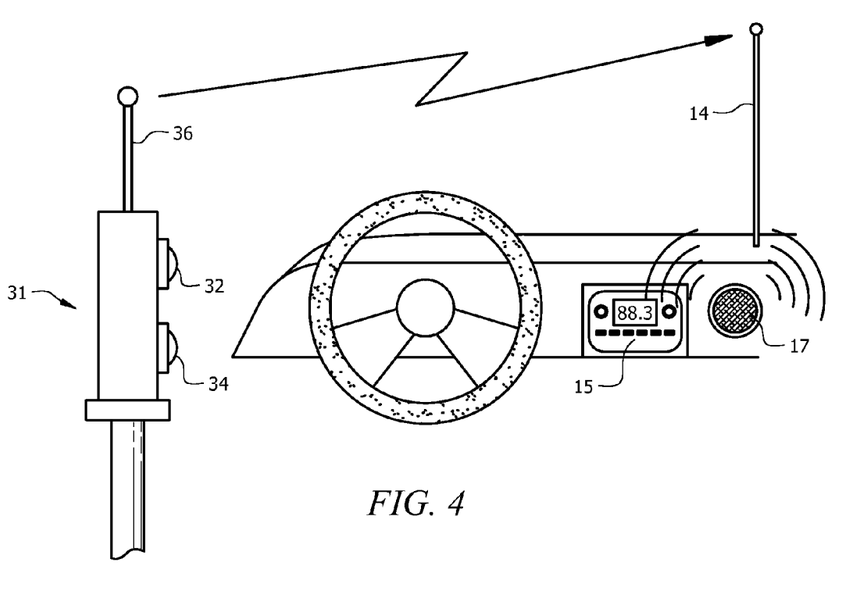
FIG. 4 illustrates a second plan view of a system of a first embodiment of the present invention.

Referring to FIG. 4, a second plan view of a system of a first embodiment of the present invention will be described. The driver 12 receives audio from the order taker position (see FIG. 6) from a short-range radio transmitter 88 (see FIG. 6) with an antenna 36. The preferred embodiment employs a short-range radio transmitter 88 (see FIG. 6) within the communication system 31, which transmits a radio signal from the antenna 36 (any antenna known in the industry) to the vehicle radio 15 through the vehicle antenna 14 (any form of vehicle antenna 14 is anticipated). It is preferred that the radio transmitter 88 transmits over a locally unused AM or FM radio channel. This is preferred because most vehicles 10 are factory equipped with an AM radio, an FM radio or an AM/FM radio. It is also anticipated that the radio transmitter 88 transmit simultaneously on both an AM station and an FM station.

Figure 5:
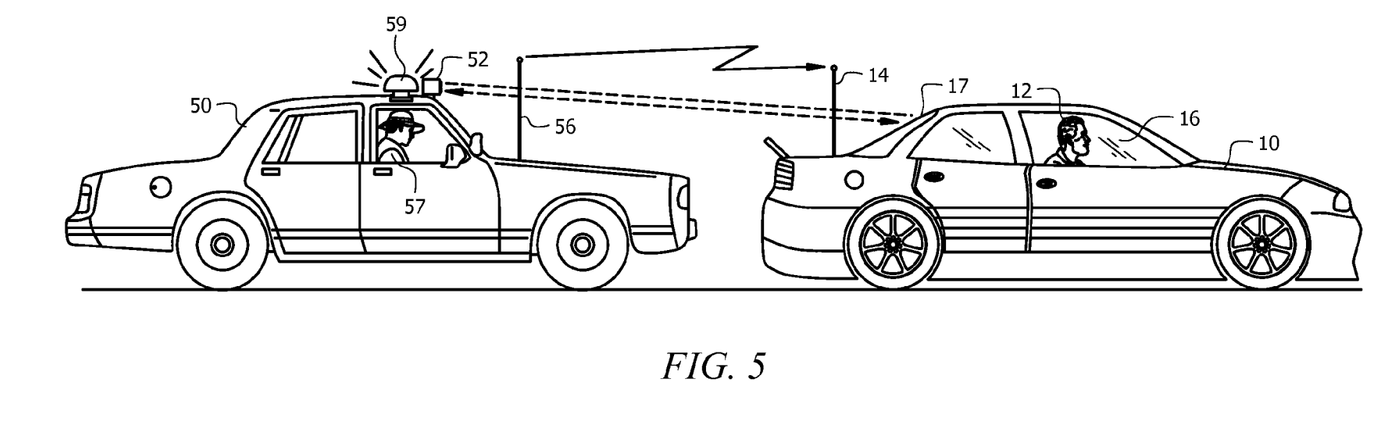
FIG. 5 illustrates a plan view of a system of a second embodiment of the present invention.

Referring to FIG. 5, a plan view of a system of a second embodiment of the present invention will be described. The present invention provides a high-quality, two-way audio communications system between a first entity such as vehicle (e.g. a car 10 with windows closed) and second entity such as a store/fast food restaurant, military check-point, entry station for a protected facility, etc. In the embodiment shown in FIG. 5, the second entity is another vehicle 50, shown as a law-enforcement vehicle 50. In this example, the vehicle 10 is the subject of a traffic stop by the law-enforcement vehicle 50. Prior to the present invention, the officer 57 had to exit their vehicle 50 and approach the suspect vehicle 10 in order to obtain information from the driver 12 (e.g., license, registration, and proof of insurance). Not only is this inconvenient in bad weather, but this has proven dangerous in many situations due to criminal activity within the vehicle 10 as well as dangers from other motorists, especially on high-speed roads.

To provide the communications between the occupants of the first vehicle 10 with the occupant of the second vehicle 50, the second vehicle 50 is equipped with the communication system of the present invention. The officer 57 speaks into a microphone 80 (see FIG. 7) and his or her voice is transmitted to the occupants of the first vehicle 10 over a short-range radio frequency signal transmitted between an antenna 56 on the second vehicle 50 to an antenna 14 on the first vehicle 10 and then into a radio 15 within the first vehicle 10 which reproduces the officer's voice. When the occupant(s) 12 of the vehicle 10 speak, the window 17 and/or body of the first vehicle 10 vibrates sympathetically with the occupant's voice. The vibration is detected by the light transceiver 52 mounted on the second vehicle 50 (shown on the roof, but any location is anticipated). In this way, the officer 57 hears whatever is being said within the first vehicle 10.

It is anticipated that some privacy issues may result in the use of such systems and, such issues, if they occur, need to be dealt with through legislation or other means. For example, it is anticipated that a law be passed to permit an officer 57 to begin reception of audio from the occupant(s) 12 of the first vehicle 10 as soon as they turn on their cherry light 59 and/or siren (not shown).

It is also anticipated that, the officer 57 needs to communicate to the occupant(s) 12 that the occupant(s) 12 need tune their radio to a specific frequency. It is anticipated that this be a community-wide norm (e.g., everybody in Saint Petersburg, Fla. understands that they need to tune to FM 100.1 when stopped by an officer 57) or by a sign or loud speaker mounted on the law-enforcement vehicle 50.

It is also anticipated that, to reduce privacy issues, the law-enforcement vehicle 50 is equipped with a detector that detects the radio station to which the radio 15 is tuned. In this, the radio 15 has a local oscillator (not shown) as known in the industry and the local oscillator matches the frequency of the radio station to which the occupant(s) 12 are tuned. The law-enforcement vehicle 50 has a sensitive RF detector, as known in the industry, that, upon detecting that the radio 15 is tuned to the specified station (e.g., FM 100.1), the voice sensor 52 is enabled. In such, the occupant(s) 12 are "giving permission" to the officer 57 by tuning to the prescribed station.

Figure 6:
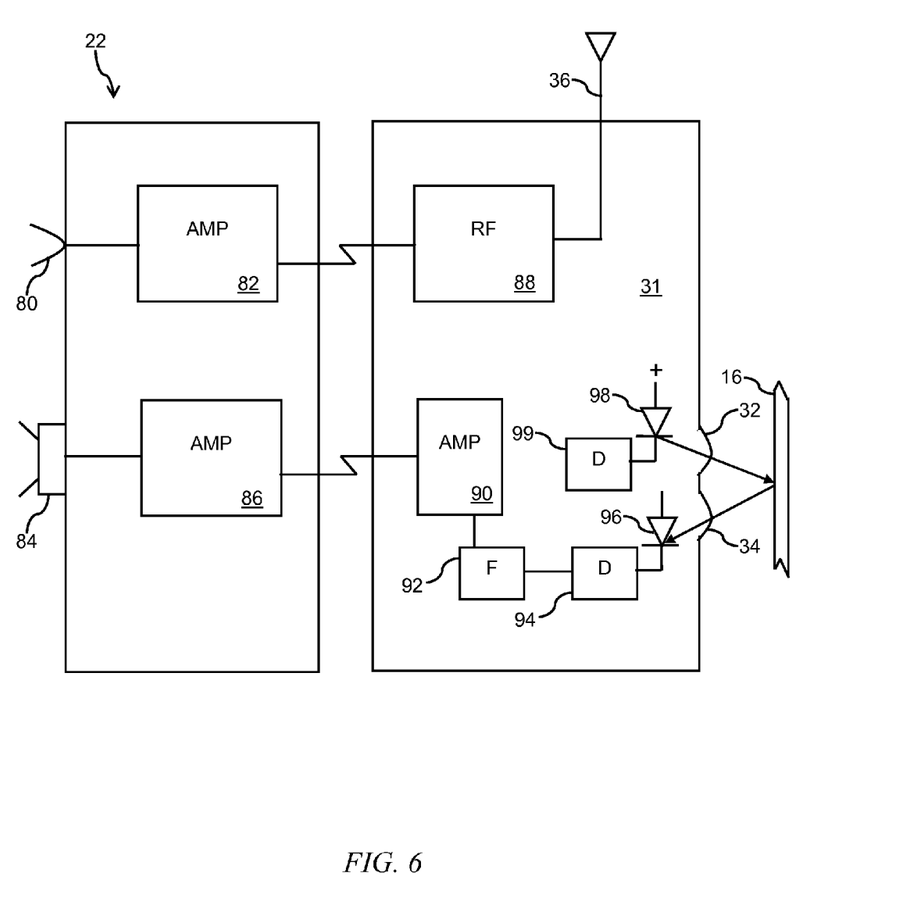
FIG. 6 illustrates a schematic view of a system of a first embodiment of the present invention.

Referring to FIG. 6, a schematic view of a system of a first embodiment of the present invention will be described. In this example, a microphone 80 is connected to an amplifier 82 that amplifies the voice from personnel within the establishment 22. The amplified audio (first audio signal) is connected to an RF transmitter 86 within the communication system 31 (e.g., within or remote from the personnel and establishment 22 through cables and/or wireless means as known in the industry). The RF transmitter 88 modulates the audio using, for example, audio modulation (AM), frequency modulation (FM) or any known modulation technique. The modulated RF signal passes out of the communication system 31 via an antenna 36, as known in the industry.

In this example, a laser diode 98 is utilized, though any known source of light is anticipated. The laser diode 98 is controlled by a driver circuit 99, as known in the industry and emits light through the light transmitter orifice 32. The light reflects off of the vehicle window 16 and back though the light receiver orifice 34 and onto a detector 96, in this example, a photo diode, although any known detection device is anticipated. The light detector 96 converts the light reflected from the window 16 into an electrical signal. The light detector 96 is coupled to a detection circuit 94 which extracts a second audio signal from the electrical signal. This second audio signal is passed through an optional filter 92. The filter 92 removes unwanted noise such as that caused by the vehicle's engine. The second audio signal is amplified by an optional amplifier 90 (as known in the industry) and coupled to a power amplifier 86 (e.g., within the establishment) by wired or wireless means, as known in the industry. The power amplifier 86 amplifies the audio sufficiently to drive a speaker 84 and/or headphones (not shown) to reproduce the second audio signal in an audible fashion. Many other circuits and/or arrangements are known and anticipated, the one shown in FIG. 6 being but one example of such.

Figure 7:
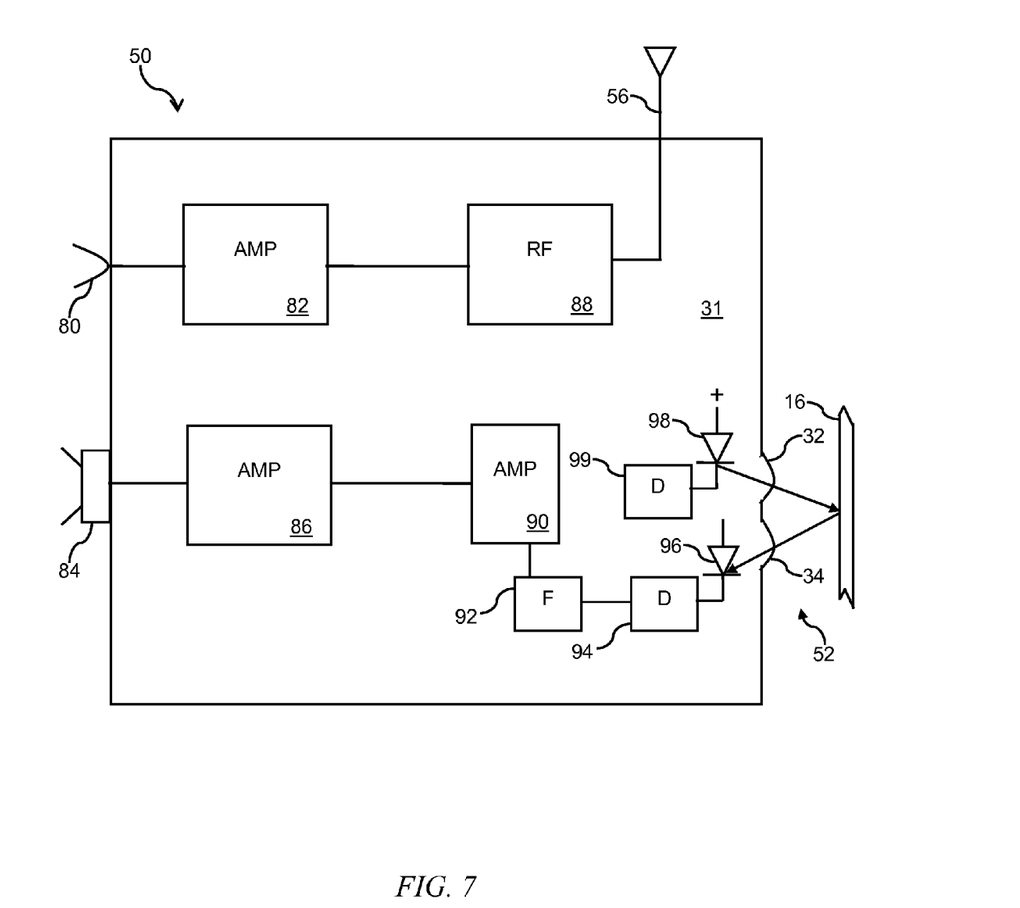
FIG. 7 illustrates a schematic view of a system of a second embodiment of the present invention.

Referring to FIG. 7, a schematic view of a system of a second embodiment of the present invention will be described. In this example, a microphone 80 is connected to an amplifier 82 that amplifies the voice from personnel within, for example, the law enforcement vehicle 50. The amplified audio is connected to an RF transmitter 88 within the communication system 31. The RF transmitter modulates the audio using, for example, audio modulation (AM), frequency modulation (FM) or any known modulation technique. The modulated RF signal passes out of the communication system 31 via an antenna 56, as known in the industry.

In this example, a laser diode 98 is utilized, though any known source of light is anticipated. The laser diode 98 is controlled by a driver circuit 99, as known in the industry and emits light through the light transmitter orifice 32 of the vehicle transceiver 52. The light reflects off the vehicle window 16 and back though the light receiver orifice 34 and onto a detector 96, in this example, a photo diode, although any known detection device is anticipated. The detector 96 converts the reflected light into an electrical signal. The electrical signal from the detector 96 is coupled to a detection circuit 94 which extracts a second audio signal. This second audio signal is passed through an optional filter 92. The filter 92 removes unwanted noise such as that caused by the vehicle's engine. The second audio signal from the filter 92 is amplified by an optional amplifier 90 (as known in the industry) and coupled to a power amplifier 86 (within the law enforcement vehicle 50) as known in the industry. The power amplifier 86 amplifies the second audio signal sufficiently to drive a speaker 84 or headphones (not shown), making the second audio signal audible to a person. Many other circuits and/or arrangements are known and anticipated, the one shown in FIG. 7 being but one example of such.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A vehicle communication apparatus comprising:
a light source located outside of a vehicle and directed onto the vehicle, the light source emits light in a direction towards the vehicle;
a detector positioned to receive at least part of the light that is reflected from the vehicle, the detector converts the at least part of the light into an electrical signal;
an audio detector operatively coupled to the detector, the audio detector receives the electrical signal and the audio detector extracts an audio signal from the electrical signal; and
an audio output device operatively coupled to the audio detector, the audio output device receives the audio signal from the audio detector and reproduces the audio signal to be audible outside of the vehicle.

2. The vehicle communication apparatus of claim 1, wherein the light source emits a laser light.

3. The vehicle communication apparatus of claim 1, wherein the light source is a semiconductor laser diode.

4. The vehicle communication apparatus of claim 1, wherein the detector is a photo diode.

5. The vehicle communication apparatus of claim 1, wherein the audio detector further comprises a filter, the filter removing at least some environment noise from the audio signal.

6. The vehicle communication apparatus of claim 1, further comprising:
a radio frequency transmitter, the radio frequency transmitter modulates a second audio signal onto a radio frequency signal, the radio frequency transmitter being located outside of the vehicle;
a radio receiver associated with the vehicle and located within the vehicle, the radio receiver demodulates the second audio signal from the radio frequency signal and presents the second audio signal for listening within the vehicle.

7. The vehicle communication apparatus of claim 6, wherein the radio frequency transmitter, the light source, the detector, the audio detector, and the audio output device are associated with a second vehicle.

8. The vehicle communication apparatus of claim 6, wherein the radio frequency transmitter, the light source, the detector, the audio detector, and the audio output device are associated with an entry station of a protected facility.

9. A method of communicating between a person within a vehicle and a person external to the vehicle, the method comprising:
providing the vehicle communication apparatus of claim 6;
modulating the second audio signal on a radio frequency by the radio frequency transmitter;
receiving the radio frequency by the radio receiver within the vehicle;
demodulating the second audio signal from the radio frequency and reproducing the second audio signal by the radio receiver within the vehicle such that the second audio signal is audibly reproduced within the vehicle;
emitting a light beam from the light source towards the vehicle;
receiving at least some of the light beam reflected from the vehicle by the detector;
extracting the audio signal from the reflected light beam by the audio detector; and
amplifying the audio signal by the audio output device to be audible at a location external to the vehicle.

10. The method of claim 9, wherein the step of emitting the light beam includes emitting light from a laser light source.

11. The method of claim 9, wherein the step of emitting the light beam includes emitting light from an infra-red light source.

12. The method of claim 9, wherein the step of receiving includes a photo diode positioned to receive at least part of the light that is reflected from the vehicle, the photo diode converts the at least part of the light into the electrical signal.

13. The method of claim 9, further comprising after the step of extracting, a step of filtering noise from the audio signal to remove at least some environment noise.

14. The method of claim 9, wherein the radio frequency transmitter, the light source, the detector, the audio detector, and the audio output device are associated with a second vehicle which is a law-enforcement vehicle.

15. A vehicle communication apparatus comprising:
a radio frequency transmitter, the radio frequency transmitter receives a first audio signal and modulates the first audio signal onto a radio frequency signal;
a radio associated with a vehicle, the radio receives the radio frequency signal and demodulates the first audio signal from the radio frequency signal, amplifies the first audio signal, and emits the first audio signal from a transducer for listening within the vehicle;
a light source, the light source is directed towards the vehicle, the light source emits light onto the vehicle;
a detector, the detector receives at least part of the light reflected from the vehicle, the detector converts the at least part of the light that is reflected from the vehicle into an electrical signal;
an audio detector operatively coupled to the detector, the audio detector extracts a second audio signal from the electrical signal; and
an audio output device, the audio output device receives the second audio signal from the audio detector and reproduces the second audio signal to be audible external to the vehicle.

16. The vehicle communication apparatus of claim 15, wherein the audio detector further comprises a filter, the filter removing at least some environment noise.

17. The vehicle communication apparatus of claim 15, wherein the radio frequency transmitter, the light source, the detector, the audio detector, and the audio output device are affixed to a law-enforcement vehicle and the vehicle is in proximity of the law-enforcement vehicle.

18. The vehicle communication apparatus of claim 17, wherein the light source and the detector are mounted on a roof of the law-enforcement vehicle.

19. The vehicle communication apparatus of claim 15, wherein the light source emits a laser light.

20. The vehicle communication apparatus of claim 15, wherein the radio frequency transmitter, the light source, the detector, the audio detector, and the audio output device are integrated into an entry station for a protected facility.

* * * * *